(12) United States Patent
Liang et al.

(10) Patent No.: US 9,483,086 B2
(45) Date of Patent: Nov. 1, 2016

(54) BUSINESS OBJECT DETAIL DISPLAY

(75) Inventors: Xuebo Liang, Brossard (CA); Isabelle Thore, Westmount (CA); Mohannad El-Jayousi, L'Ile Bizard (CA); Rolan Abdukalykov, Montreal (CA); Alain Gauthier, Montreal (CA); Roy Ghorayeb, Montreal (CA); Vincent Lavoie, Montreal (CA)

(73) Assignee: SAP SE, Walldorf (DE)

( * ) Notice: Subject to any disclaimer, the term of this patent is extended or adjusted under 35 U.S.C. 154(b) by 500 days.

(21) Appl. No.: 13/561,796

(22) Filed: Jul. 30, 2012

(65) Prior Publication Data

US 2014/0028728 A1    Jan. 30, 2014

(51) Int. Cl.
*G09G 5/14*    (2006.01)
*G06F 1/16*    (2006.01)
*G06F 3/0481*   (2013.01)

(52) U.S. Cl.
CPC .......... *G06F 1/1694* (2013.01); *G06F 3/0481* (2013.01); *G06F 2200/1637* (2013.01)

(58) Field of Classification Search
CPC .................................................. G06F 3/04883
USPC ......................................... 345/661; 715/863
See application file for complete search history.

(56) References Cited

U.S. PATENT DOCUMENTS

| | | | |
|---|---|---|---|
| 5,323,314 A | 6/1994 | Baber et al. | |
| 5,745,110 A | 4/1998 | Ertemalp | |
| 5,867,163 A | 2/1999 | Kurtenbach | |
| 5,898,431 A | 4/1999 | Webster et al. | |
| 6,054,989 A | 4/2000 | Robertson et al. | |
| 6,201,554 B1 | 3/2001 | Lands | |
| 6,380,953 B1 | 4/2002 | Mizuno | |
| 6,674,450 B1 | 1/2004 | Toub et al. | |
| 6,915,490 B1 | 7/2005 | Ewing | |

(Continued)

FOREIGN PATENT DOCUMENTS

| | | |
|---|---|---|
| AU | 2011101579 A4 | 2/2012 |
| EP | 1696301 A1 | 8/2006 |

(Continued)

OTHER PUBLICATIONS

Anonymous: "Google Calendar—Revision as of 16:55, Apr. 17, 2012," Apr. 17, 2012, pp. 1-7, Gustavus Adolphus College, retrieved from the Internet: URL:https://gustavus.edu/gts/w/index.php?title=Google_Calendar & oldid=24920 [retrieved on Jan. 10, 2014].

(Continued)

*Primary Examiner* — Javid A Amini
(74) *Attorney, Agent, or Firm* — Jones Day

(57) ABSTRACT

Scale(s) on one or more axes may be displayed. The scale(s) may present a range of values associated with at least one business object attribute. Visual representation(s) of business object(s) may be displayed. The visual representation(s) may be positioned relative to the scale(s). Detail boxes corresponding to each visually represented business object may be displayed. Each detail box may present information about a corresponding business object. All detail boxes may be displayed. Information presented by the detail box(es) may be an image and/or text. The information presented by the detail box(es) may be interactive. Displaying or not displaying the detail box(es) may be toggled. The visual representation(s) of the business object(s) may be repositioned based on the toggling.

14 Claims, 4 Drawing Sheets

(56) References Cited

U.S. PATENT DOCUMENTS

| | | |
|---|---|---|
| 7,050,056 B2 | 5/2006 | Meyringer |
| 7,168,045 B2 * | 1/2007 | Fliess et al. .................. 715/771 |
| 7,225,285 B1 | 5/2007 | Fairman et al. |
| 7,340,484 B2 | 3/2008 | S et al. |
| 7,421,645 B2 | 9/2008 | Reynar |
| 7,546,577 B2 * | 6/2009 | Do et al. ........................ 717/108 |
| 7,603,381 B2 | 10/2009 | Burke et al. |
| 7,739,695 B2 | 6/2010 | Wood et al. |
| 7,908,584 B2 | 3/2011 | Singh et al. |
| 8,024,666 B2 | 9/2011 | Thompson |
| 8,191,003 B2 | 5/2012 | Brown et al. |
| 8,214,748 B2 | 7/2012 | Srikanth et al. |
| 8,402,480 B2 | 3/2013 | Rohwer |
| 8,788,303 B1 | 7/2014 | Krone et al. |
| 8,812,546 B1 | 8/2014 | Cornali |
| 2001/0042059 A1 | 11/2001 | Uehara et al. |
| 2002/0091586 A1 | 7/2002 | Wakai et al. |
| 2002/0130899 A1 | 9/2002 | Ryan et al. |
| 2002/0158969 A1 | 10/2002 | Gupta |
| 2003/0058287 A1 | 3/2003 | Stanley |
| 2003/0066032 A1 | 4/2003 | Ramachandran et al. |
| 2003/0120621 A1 | 6/2003 | McDaniel et al. |
| 2003/0160815 A1 | 8/2003 | Muschetto |
| 2003/0182210 A1 | 9/2003 | Weitzman et al. |
| 2003/0229848 A1 | 12/2003 | Arend et al. |
| 2004/0001092 A1 | 1/2004 | Rothwein et al. |
| 2004/0252134 A1 | 12/2004 | Bhatt et al. |
| 2005/0050010 A1 | 3/2005 | Linden |
| 2005/0144038 A1 | 6/2005 | Tamblyn et al. |
| 2005/0171410 A1 | 8/2005 | Hjelt et al. |
| 2005/0197998 A1 | 9/2005 | Asbury |
| 2005/0262452 A1 | 11/2005 | Sauermann |
| 2005/0278217 A1 | 12/2005 | Adams et al. |
| 2005/0278354 A1 | 12/2005 | Gupta et al. |
| 2005/0278372 A1 | 12/2005 | Shaburov et al. |
| 2005/0289202 A1 | 12/2005 | S et al. |
| 2006/0036568 A1 * | 2/2006 | Moore .............. G06F 17/30126 |
| 2006/0069666 A1 | 3/2006 | Burke et al. |
| 2006/0089877 A1 | 4/2006 | Graziano et al. |
| 2006/0206522 A1 | 9/2006 | Austin et al. |
| 2006/0238538 A1 | 10/2006 | Kapler et al. |
| 2006/0242121 A1 | 10/2006 | DeVorchik et al. |
| 2006/0268742 A1 | 11/2006 | Chu et al. |
| 2007/0064022 A1 | 3/2007 | Silverbrook et al. |
| 2007/0156430 A1 | 7/2007 | Kaetker et al. |
| 2007/0180377 A1 * | 8/2007 | Gittelman ............ G06Q 10/109 |
| | | 715/703 |
| 2007/0199006 A1 | 8/2007 | Mukundan et al. |
| 2007/0211056 A1 | 9/2007 | Chakraborty et al. |
| 2007/0219842 A1 | 9/2007 | Bansal et al. |
| 2007/0233539 A1 | 10/2007 | Suenderhauf et al. |
| 2007/0239351 A1 | 10/2007 | Sherrill et al. |
| 2007/0244875 A1 | 10/2007 | Bodin et al. |
| 2007/0268246 A1 | 11/2007 | Hyatt |
| 2007/0288283 A1 | 12/2007 | Fitzpatrick |
| 2008/0040684 A1 | 2/2008 | Crump |
| 2008/0077549 A1 | 3/2008 | Glania et al. |
| 2008/0114625 A1 | 5/2008 | Kline et al. |
| 2008/0120129 A1 | 5/2008 | Seubert et al. |
| 2008/0141142 A1 | 6/2008 | Lyle et al. |
| 2008/0148190 A1 | 6/2008 | Schaff |
| 2008/0163125 A1 | 7/2008 | Gu et al. |
| 2008/0163126 A1 | 7/2008 | Rao |
| 2008/0168397 A1 | 7/2008 | Nelson |
| 2008/0178101 A1 | 7/2008 | Rode et al. |
| 2008/0178500 A1 | 7/2008 | Teuteberg |
| 2008/0195969 A1 | 8/2008 | Brown et al. |
| 2008/0221946 A1 | 9/2008 | Balon |
| 2008/0294994 A1 | 11/2008 | Kruger et al. |
| 2008/0307314 A1 | 12/2008 | Cisler et al. |
| 2008/0307323 A1 | 12/2008 | Coffman et al. |
| 2008/0313005 A1 | 12/2008 | Nessland et al. |
| 2008/0319818 A1 | 12/2008 | Gurdin et al. |
| 2008/0320558 A1 | 12/2008 | Imanishi et al. |
| 2009/0049372 A1 | 2/2009 | Goldberg |
| 2009/0076878 A1 | 3/2009 | Woerner et al. |
| 2009/0158173 A1 | 6/2009 | Palahnuk et al. |
| 2009/0174680 A1 | 7/2009 | Anzures et al. |
| 2009/0254370 A1 * | 10/2009 | Kondo .................. G06F 19/322 |
| | | 705/3 |
| 2009/0254597 A1 | 10/2009 | Karoji |
| 2009/0293074 A1 | 11/2009 | Rohwer |
| 2009/0313268 A1 | 12/2009 | Folting et al. |
| 2010/0030783 A1 | 2/2010 | Ho et al. |
| 2010/0099462 A1 | 4/2010 | Baek et al. |
| 2010/0131889 A1 | 5/2010 | Helmolt et al. |
| 2010/0138334 A1 | 6/2010 | Warsaw et al. |
| 2010/0145936 A1 | 6/2010 | Grinstein et al. |
| 2010/0251954 A1 | 10/2010 | Yamada |
| 2010/0318640 A1 | 12/2010 | Mehta et al. |
| 2010/0325582 A1 | 12/2010 | Bansal et al. |
| 2010/0333014 A1 | 12/2010 | Fritzley et al. |
| 2011/0029521 A1 | 2/2011 | Thayne et al. |
| 2011/0072394 A1 | 3/2011 | Victor |
| 2011/0078016 A1 | 3/2011 | Wagenblatt et al. |
| 2011/0078058 A1 | 3/2011 | Wagenblatt et al. |
| 2011/0078171 A1 | 3/2011 | Wagenblatt et al. |
| 2011/0087708 A1 | 4/2011 | Teichmann et al. |
| 2011/0099500 A1 | 4/2011 | Smith et al. |
| 2011/0153629 A1 | 6/2011 | Lehmann et al. |
| 2011/0157005 A1 | 6/2011 | Inoue |
| 2011/0167369 A1 | 7/2011 | van Os |
| 2011/0167382 A1 | 7/2011 | van Os |
| 2011/0179368 A1 | 7/2011 | King et al. |
| 2011/0269435 A1 | 11/2011 | Dieckman |
| 2011/0276351 A1 | 11/2011 | Kondo et al. |
| 2011/0283242 A1 * | 11/2011 | Chew ................ G06F 17/30994 |
| | | 715/863 |
| 2011/0289422 A1 | 11/2011 | Spivack et al. |
| 2011/0298830 A1 | 12/2011 | Lam |
| 2012/0011426 A1 | 1/2012 | Yach |
| 2012/0032877 A1 | 2/2012 | Watkins, Jr. et al. |
| 2012/0036091 A1 | 2/2012 | Cook |
| 2012/0036485 A1 | 2/2012 | Watkins, Jr. et al. |
| 2012/0052921 A1 | 3/2012 | Lim et al. |
| 2012/0079408 A1 | 3/2012 | Rohwer |
| 2012/0105484 A1 | 5/2012 | Cui |
| 2012/0117493 A1 | 5/2012 | Gu et al. |
| 2012/0131496 A1 | 5/2012 | Goossens et al. |
| 2012/0159402 A1 | 6/2012 | Nurmi et al. |
| 2012/0174013 A1 | 7/2012 | Kraus et al. |
| 2012/0198369 A1 | 8/2012 | Sorin et al. |
| 2012/0253869 A1 | 10/2012 | Ansley |
| 2012/0284637 A1 | 11/2012 | Boyer et al. |
| 2012/0304121 A1 | 11/2012 | Cahill et al. |
| 2012/0311475 A1 | 12/2012 | Wong |
| 2013/0038625 A1 | 2/2013 | Nakajima |
| 2013/0074003 A1 | 3/2013 | Dolenc |
| 2013/0085961 A1 | 4/2013 | Naghshin et al. |
| 2013/0144880 A1 | 6/2013 | Kemmer et al. |
| 2013/0290340 A1 | 10/2013 | Suermondt et al. |
| 2013/0321340 A1 | 12/2013 | Seo et al. |
| 2014/0036639 A1 | 2/2014 | Boni et al. |
| 2014/0109015 A1 | 4/2014 | Farn |
| 2014/0225897 A1 | 8/2014 | Sarrazin et al. |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |
| WO | 2009121227 A1 | 10/2009 |

OTHER PUBLICATIONS

Google: "Android 2.3.4 User's Guide," googleusercontent.com, May 20, 2011, retrieved on Oct. 10, 2013 from the Internet: URL:http://static.googleusercontent.com/external_content/ untrusted_dlcp/www.google.com/en/help/hc/pdfs/mobile/ AndroidUsersGuide-2.3.4.pdf.

"Active Knowledge Modeling—Architect Your Business—12 Different Ways to Model Business Processes," http://

(56) References Cited

OTHER PUBLICATIONS activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

IBM TDB and Torres, R.J. "Zooming on Visual Calendar Data," IPCOM Prior Art Database, http://ip.com/IPCOM/000121803, Sep. 1, 1991, 2 pages.

Burigat et al., "Visualizing references to off-screen content on mobile devices: a comparison of Arrows, Wedge, and Overview + Detail," Interacting With Computers, 2011 Elsevier B.V., pp. 156-166.

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL: http://citeseerx.ist.psu.edu/viewdoc/download?doi=10.1.1.202.6970&rep=rep1&type=pdf), 2001.

SEAVUS Project Viewer 4.1, User Manual, 2009—Section 3.7 (groups) 3.6 (filters).

Office Action, dated Feb. 4, 2015, from EP Application No. 13178606.3 filed Jul. 30, 2013.

Tri-State Tree View Control for .NET 1.1—Code Project, Dec. 14, 2007, 10 pages, http://www.codeproject.com/Articles/22116/Tri-State-Tree-View-Control-for-NET.

Telerik XAMLflix Tree View—Part 4: Implement a Tri-state CheckBox Using MVVM, YouTube video published Apr. 24, 2012 with 7 screenshots, https://www.youtube.com/watch?v=xlyj7-kv7_w.

Tri-State Tree View Control—CodeProject, Nov. 2, 2005, 7 pages, http://www.codeproject.com/Articles/6549/Tri-State-TreeView-Control.

Tri-State Tree View—CodeProject, May 30, 2011, 17 pages, http://www.codeproject.com/Articles/202435/Tri-State-Tree-View.

Office Action, dated Feb. 8, 2016, from EP Application No. 13178606.3 filed Jul. 30, 2013.

* cited by examiner

BUSINESS OBJECT DETAIL DISPLAY

BACKGROUND

Business software such as enterprise resource planning (ERP) software implements business processes by modeling business data as business objects (BOs) with data exchange between the BOs. The business data provided via BOs can be accessed through mechanisms such as graphical user interfaces (GUIs), forms, and analytical reports.

Traditionally, GUIs providing access to BOs render visual representations of the BOs to convey very limited information about the attributes associated with the BOs. However, to access most of the attributes associated with the BOs, the user of the GUI has to perform additional steps such as clicking on the visual representations of the BOs, tapping on the visual representations of the BOs via a touch screen, etc. In addition, once the user accesses the attributes associated with the BOs, the user has to then perform further additional steps (again, such as clicking, tapping on a touch screen, etc.) to return to the visual representations of the BOs.

DETAILED DESCRIPTION

Embodiments may be discussed in systems to efficiently display information about BOs. In an embodiment, scale(s) on one or more axes may be displayed. The scale(s) may present a range of values associated with at least one business object attribute. Visual representation(s) of business object(s) may be displayed. The visual representation(s) may be positioned relative to the scale(s). Detail boxes corresponding to each visually represented business object may be displayed. Each detail box may present information about a corresponding business object.

In an embodiment, all detail boxes may be displayed. In an embodiment, information presented by the detail box(es) may be an image, graph, and/or text. In an embodiment, the information presented by the detail box(es) may be interactive. In an embodiment, displaying or not displaying the detail box(es) may be toggled. In an embodiment, the visual representation(s) of the business object(s) may be repositioned based on the toggling.

Business software usually includes a standard set of BOs which can be utilized by the software user to model a business entity. For example, in an embodiment, business software may include BOs representing business entities such as business promotions (trade promotions), sales orders, sales quotes, customer quotes, service documents, business opportunities, etc. Each BO may include attributes which define metadata associated with the BO. For example, a business promotion BO may represent a business promotion offered by a first company through a second company to consumers. The first company may be a soft drink company and the second company may be a major retailer. The promotion may have a start date and an end date (a promotion period). The promotion may offer the product, for example, a soft drink, for the promotion period at a particular sale price. The business promotion BO may include attributes such as the name of the second company, the size of the second company, the type of the second company, the name of the promotion product, the sale price of the product during the promotion, the price of the product without the promotion, the quantity of the product sold during the promotion, the start date of the promotion, and the end date of the promotion.

Attributes of BOs may indicate a range of values. For example, in an embodiment, a business promotion BO may include one or more attributes indicating the time period for which the business promotion is valid. The time period may be implemented by either defining a single time period attribute associated with the business promotion BO or by defining a start date attribute and an end date attribute associated with the business promotion BO. Similarly, in another example embodiment, the business promotion may only apply if particular quantities of a product are purchased. Therefore, the business promotion BO may include one or more attributes indicating a range of quantities to which the business promotion applies to.

Figure 1:
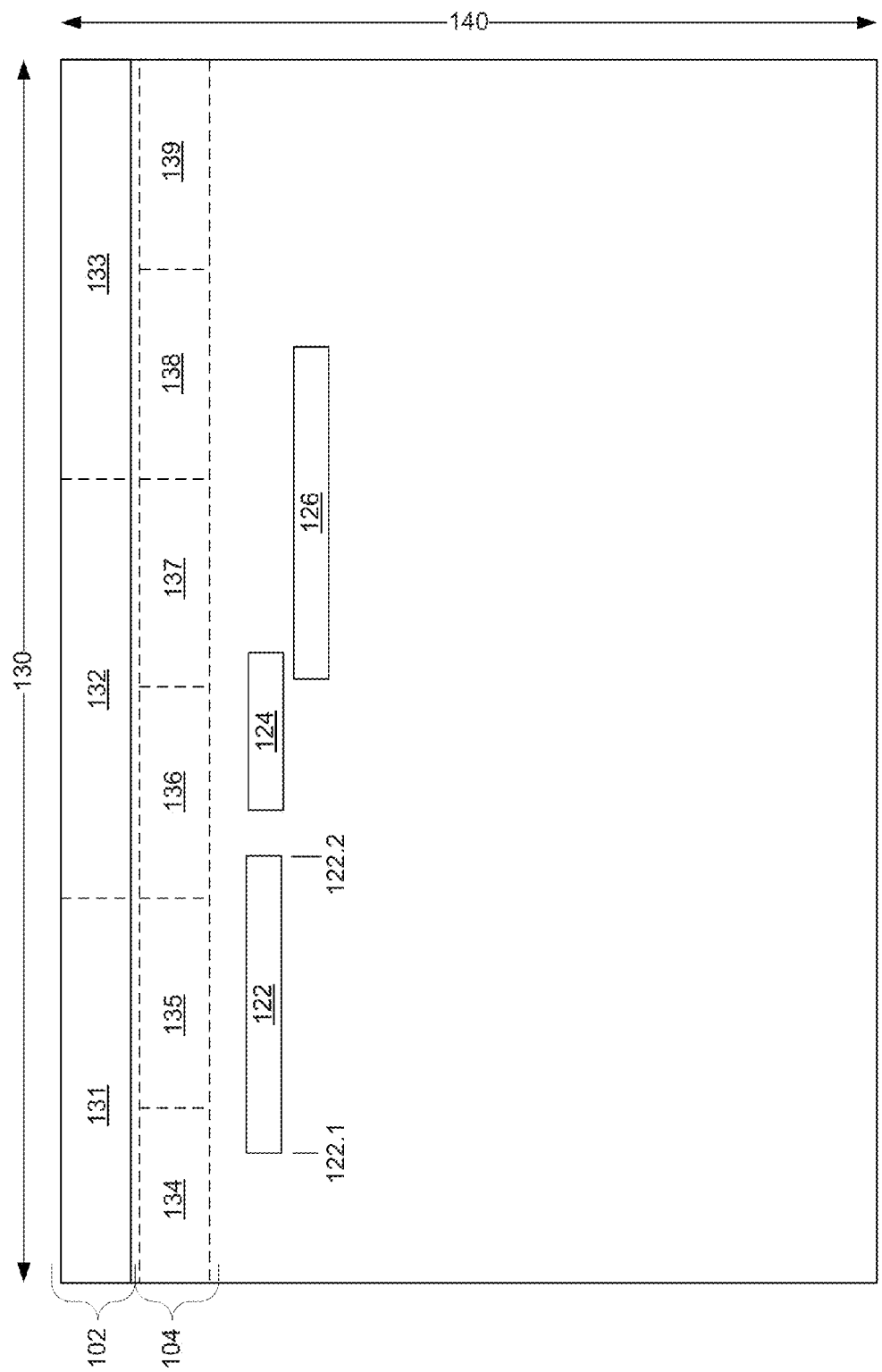
FIG. 1 illustrates a GUI to display BOs according to an embodiment.

FIG. 1 illustrates a GUI 100 to display BOs according to an embodiment. In an embodiment, BOs may be displayed on a GUI 100 in an organized manner to visually convey information about the BOs. The GUI 100 may display one or more scales 102, 104 on the x-axis 130 and/or y-axis 140. The GUI 100 may display visual representations of BOs such as 122, 124, and 126 mapped in relationship to the attributes on the x-axis 130 and/or y-axis 140.

In an embodiment, the attribute(s) displayed across the x-axis 130 and/or y-axis 140 may be presented as one or more scales displaying attribute values (for example, 102 and 104). In an embodiment, if multiple scales are presented on a particular axis, each scale may be graduated based on different granularities. For example, scales 102 and 104 may represent time periods. Scale 102 may be graduated into year units. Specifically, each of 131, 132, and 133 may represent a year. Scale 104 may be graduated on a semi-annual basis. Specifically, 134-139 may each represent half of a year.

In an embodiment, there may be a correlation between the multiple scales on a particular axis. For example, there may be a correlation between the units of scale 102 and scale 104. Time period 131 on scale 102 may represent a particular year, such as year 2012. The time period 134 may represent the first half of the year 2012, and the time period 135 may represent the second half of year 2012. In an embodiment the correlated portions of multiple scales may be presented directly above/below (x-axis) or directly beside (y-axis) each other. For example, time period 131 may be located directly above/below corresponding time periods 134 and 135.

The scale(s) displayed on the x-axis and/or y-axis 102 and 104 may be a range of contiguous values and/or discrete values. For example, the scales 102 and 104 may represent a contiguous time period of three years, a contiguous price range between zero Canadian dollars and 30 Canadian dollars, a contiguous temperature range between 0 degrees Fahrenheit and 90 degrees Fahrenheit, etc. In another example, the scales 102 may represent discrete products such as car A (131), car B (132) and car C (133).

In an embodiment, one or more scales (not shown) may be presented on the y-axis 140. The y-axis scale(s) may be presented and function similar to the x-axis scale(s) described above. Although only two axes (x and y) are illustrated in FIG. 1, a person having ordinary skill in the art will appreciate that GUI 100 may be extended to display additional axes. For example, a z-axis (with corresponding scale(s)) may be displayed by utilizing shading to show the third dimension. In a further example, the z-axis (with corresponding scale(s)) may be presented by displaying GUI 100 on a display which is 3-dimension (3D) compatible.

In an embodiment, the BO(s) displayed on the GUI 100 may be positioned and presented based on respective attribute value(s) of the BO(s) relative to the x-axis and/or y-axis scale(s) of GUI 100. In an example embodiment, scale 102 may be displayed on the GUI 100 and may indicate a time period range as explained above. BOs 122, 124, and 126 may be visual representations of business promotion BOs. Each BO represented by 122, 124, and 126 may include attributes indicating the business promotion period of the respective business promotion BO. The BO visual representations 122, 124, and 126 may be presented to visually convey the span of the business promotion periods, and the start/end of the business promotion periods. For example, time periods 131, 132, and 133 may represent years 2012, 2013, and 2014 respectively. Business promotion BO 122 may have a business promotion period from Apr. 14, 2012 to Jan. 23, 2013. Thus, BO 122 may be presented as a horizontal bar extending from start point 122.1 positioned below time period 131 to end point 122.2 positioned below time period 132. The start point 122.1 may line up with a point in the time period 131 which approximately corresponds to Apr. 14, 2012, and the end point 122.2 may line up with a point in the time period 132 which approximately corresponds to Jan. 23, 2013.

In an example embodiment, multiple scales 102 and 104 may be presented on the GUI 100 and the BO visual representations 122, 124, and 126 may be presented relative to the multiple scales. For example, time periods 134, 135, and 136 may represent the first half of year 2012, the second half of year 2012, and the first half of year 2013 respectively. Business promotion BO 122 may have a business promotion period from Apr. 14, 2012 to Jan. 23, 2013 as described previously. Thus, BO 122 may be presented as a horizontal bar extending from start point 122.1 positioned below time periods 131 and 134 to end point 122.2 positioned below time periods 132 and 136. The start point 122.1 may line up with points in the time periods 131 and 134 which approximately correspond to Apr. 14, 2012, and the end point 122.2 may line up with points in the time periods 132 and 136 which approximately correspond to Jan. 23, 2013.

In an embodiment, the GUI 100 may include multiple axes and one or more scales on each of the multiple axes. Each axis (and the associated scale(s)) may represent different BO attributes. Thus, the BO(s) presented on the GUI 100 may be presented relative to the scale(s) on each axis. For example, the scale(s) on an x-axis may represent time periods and the scale(s) on a y-axis may represent price ranges. Consequently, the bars 122, 124, and 126 representing BOs such as business promotion BOs may be displayed based on the BOs' respective business promotion periods and business promotion prices. The length of the bars 122, 124, and 126 may correspond to the business promotion period, and the width of the bars 122, 124, and 126 may correspond to the business promotion price. Similarly, BOs may be displayed relative to three axes by displaying the BOs as 3D bars and varying the length, width, and depth of the bars to correspond to the scale(s) on the three axes.

Figure 2:
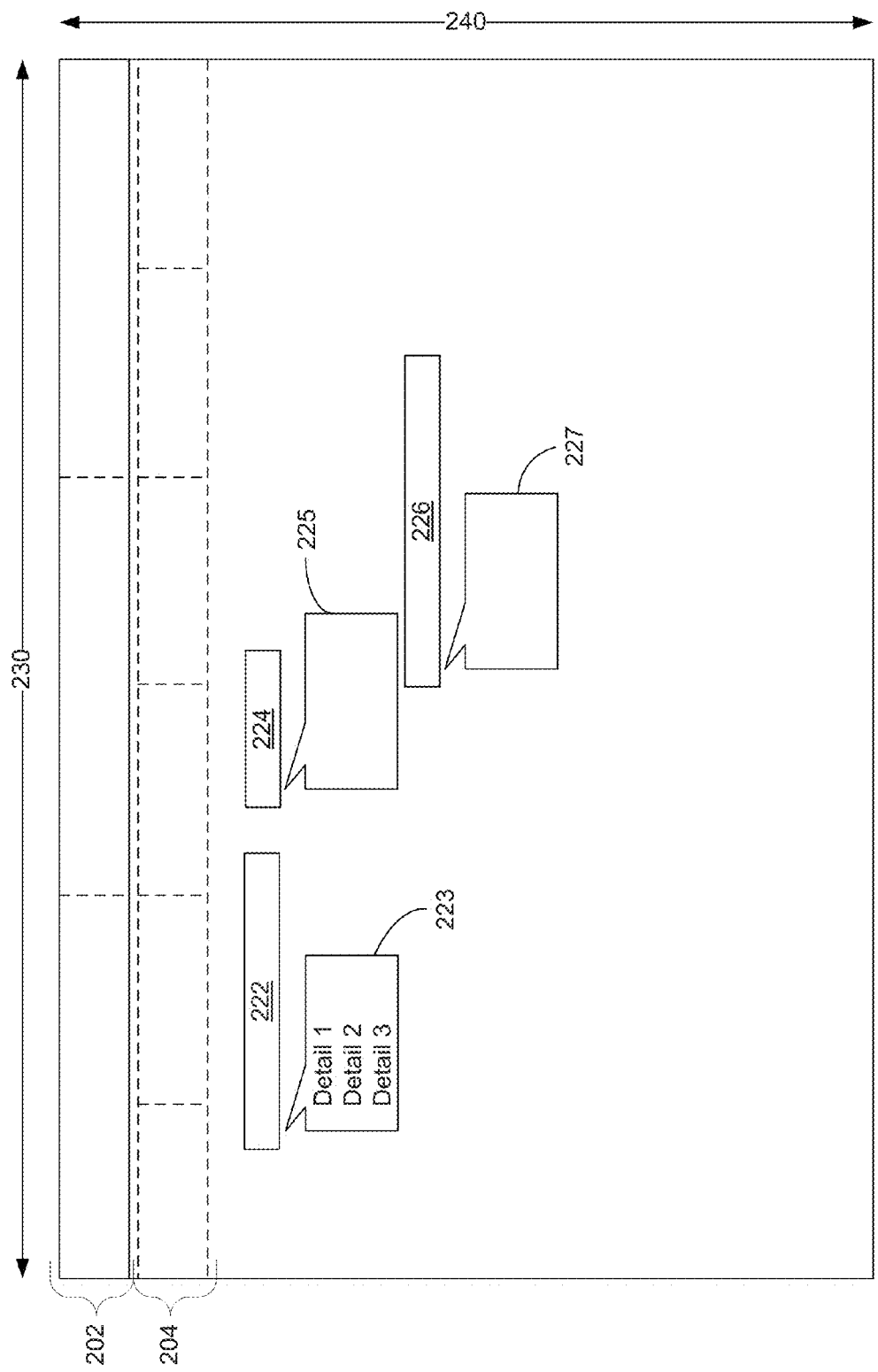
FIG. 2 illustrates a GUI to display BOs according to an embodiment.

FIG. 2 illustrates a GUI 200 to display BOs according to an embodiment. In an embodiment, BOs may be displayed on a GUI 200 in an organized manner to visually convey information about the BOs. The GUI 200 may display one or more scales 202 and 204 on the x-axis 230 and/or y-axis 240. The GUI 200 may display visual representations of BOs such as 222, 224, and 226 mapped in relationship to the attributes on the x-axis 230 and/or y-axis 240 as discussed in the description pertaining to FIG. 1 above. The GUI 200 may display detail boxes 223, 225, and 227 which present details about BOs associated with BO visual representations 222, 224, and 226 respectively.

In an embodiment, the detail boxes 223, 225, and 227 may display attributes and/or other metadata associated with the respective BOs. The information presented in the detail boxes 223, 225, and 227 may be customized through GUI 200 and/or another GUI so that only the required details are displayed. In an embodiment, the size of the detail boxes 223, 225, and 227 may be customized through GUI 200 and/or another GUI to tweak the readability of the information presented in the detail boxes. In an embodiment, the user may be able to dynamically change the size of a detail box by, for example, selecting the border(s) of the detail box and dragging the border(s) of the detail box to a desired position. The user may select and drag the border(s) of the detail box by, for example, his/her finger (when utilizing a touch screen), a mouse, keyboard, trackball, etc. In an embodiment, all detail boxes 223, 225, and 227 may be displayed without the need for a user to perform any actions on BO visual representations 222, 224, and 226. Specifically, the detail boxes may be displayed without the need for the user to click on or hover a cursor over the BO visual representations 222, 224, and 226.

In a further embodiment, a toggle switch (not shown) may be presented on the GUI 200 to turn on/off the display of detail boxes. Activating the toggle switch when the detail boxes are displayed may remove all detail boxes 223, 225, and 227 from the GUI 200. In addition, the BO visual representations 222, 224, and 226 may be repositioned on the GUI 200 to better utilize the space realized from not displaying the detail boxes 223, 225, and 227. For example, if the detail boxes are no longer displayed, BO visual representation 226 may be moved up on the y-axis 240, while maintaining the same position on the x-axis. Consequently, more space may be made available to display additional content below BO visual representation 226. Activating the toggle switch when the detail boxes 223, 225, and 227 are not displayed may re-display the detail boxes 223, 225, and 227 again. A person having ordinary skill in the art will appreciate that the toggle switch may be implemented in many ways including a button, radio buttons, check boxes, drop down menus, etc. In an embodiment, the toggle switch may not be presented on the GUI 200, but may be implemented through output from a motion sensor within the device displaying the GUI 200. For example, shaking and/or tilting a PC tablet in a particular manner may toggle the display of detail boxes.

Figure 3:
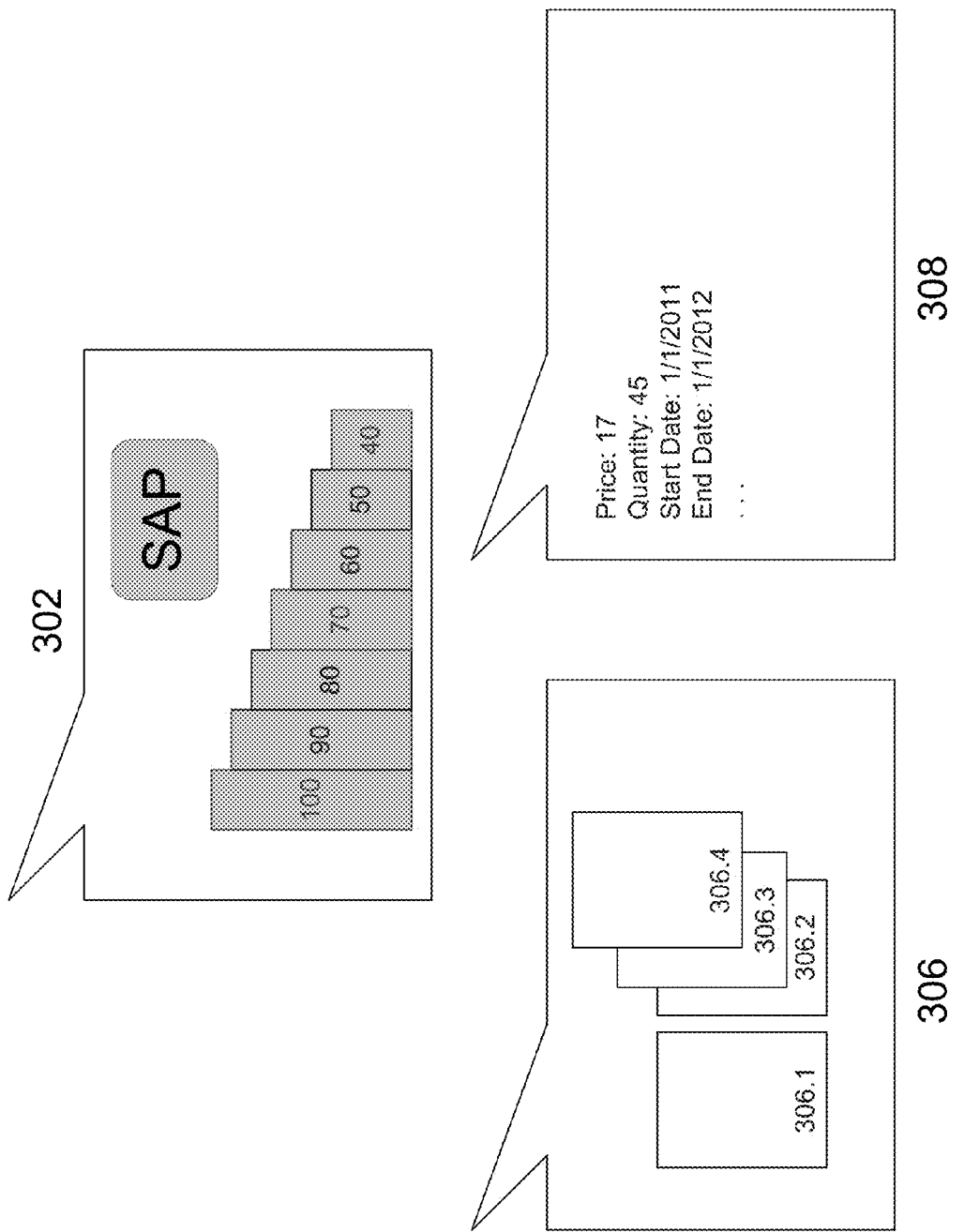
FIG. 3 illustrates magnified views of detail boxes according to an embodiment.

FIG. 3 illustrates magnified views of detail boxes according to an embodiment. Detail boxes may present information in various formats. In an embodiment, a detail box 308 may present information in text format. For example, the detail box 308 may display attributes of a BO such as price, quantity, start date, end date, etc. in text format. In an embodiment, a detail box 302 may display one or more images such as a product logo associated with a BO and performance graphs/charts associated with the BO. For example, the detail box 302 may display a chart or graph with revenue details from the sales of a product during a business promotion. In an embodiment, a detail box may present information utilizing a combination of formats. For example, a detail box may present information in text format and/or image format.

In an embodiment, a detail box 306 may be interactive. Specifically, the detail box 306 may allow a user to perform actions on the information presented in the detail box. For example, the detail box 306 may display multiple charts 306.1-306.4 pertaining to a BO, and the user may be able to dynamically navigate through the charts 306.1-306.4 by performing actions such as swiping on a touch screen displaying the detail box 306 to move from one graph to another. In an example embodiment, the user may be able to select (for example, using a mouse or a touch screen) active links in the detail box 306, and in response, the detail box 306 may display data related the selected link.

In an embodiment, the information presented in a detail box may not fully fit within the dimensions of the detail box. Therefore, the information presented may automatically scroll up, down, left, and/or right.

Although the detail boxes in FIGS. 2 and 3 are shown in a rectangular shape for illustration purposes, a person with ordinary skill in the art will appreciate that detail boxes are not restrained to any particular shape. Detail boxes may be of any shape including circular, triangular, oval, cubical, spherical, ellipsoidal, etc.

Figure 4:
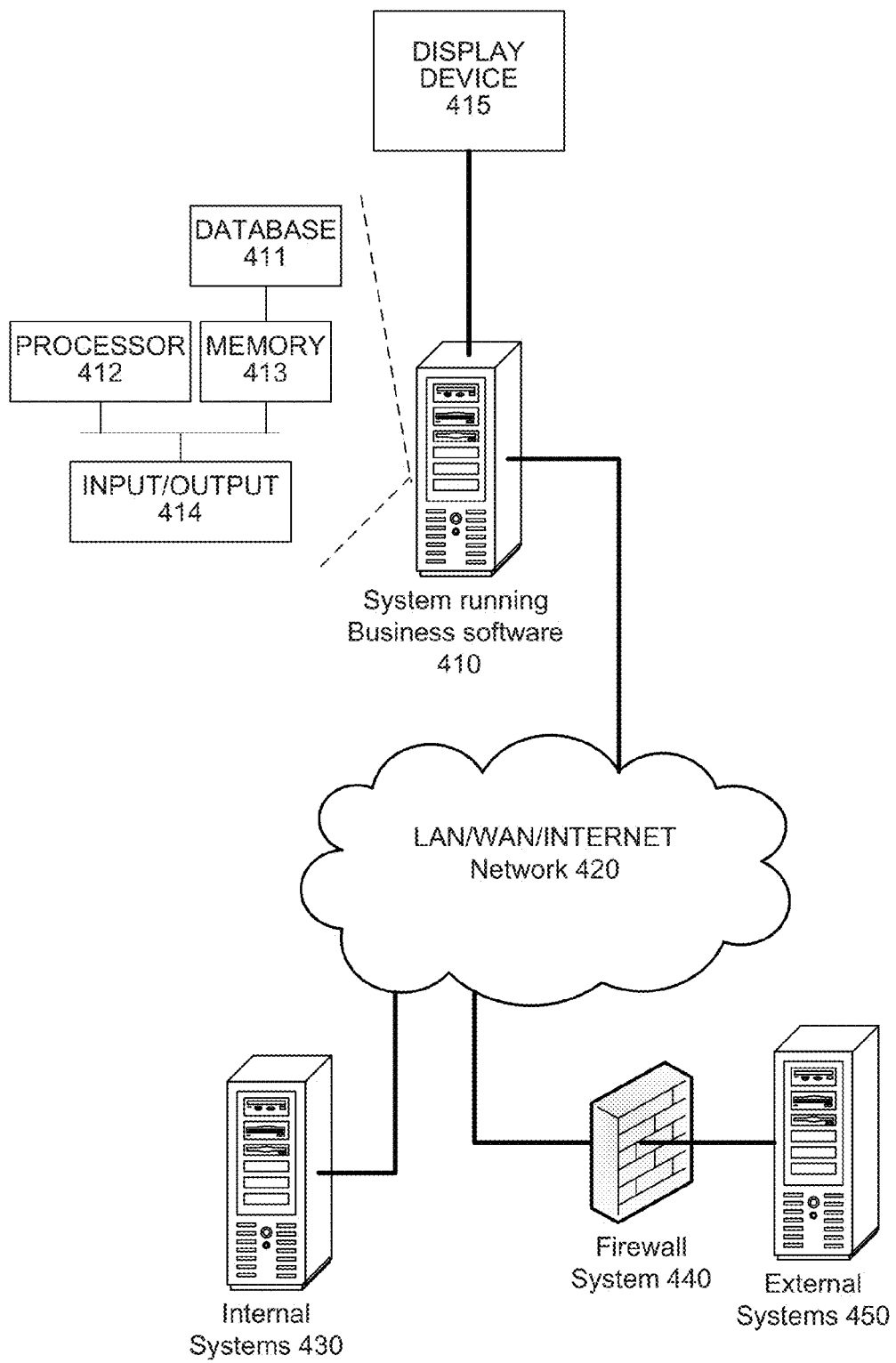
FIG. 4 shows an exemplary architecture in an embodiment.

FIG. 4 shows an exemplary architecture in an embodiment of the invention. The system running an application to view, create, or modify BOs 410 may be coupled to a display device 415, existing internal systems 430 through a network 420 and to external systems 450 through the network 420 and firewall system 440. The system running an application to view, create, or modify BOs 410 may include a desktop computer, laptop computer, tablet PC, client computer, mobile phone, central computer in a vehicle, any device with a touch screen, and any other computer. The display device 415 may include a computer monitor, a touch screen, a tablet PC screen, a mobile phone screen, and any other displays. The existing internal systems 430 may include a server and may provide business data and/or other data. The external systems 450 may include a server and may be maintained by a third party, such as an information service provider, and may contain business data and/or other data, that may be updated by the third party on a periodic basis. The system running an application to view, create, or modify BOs 410 may interact with these external systems to obtain updates through a firewall system 440 separating the internal systems from the external systems.

A person having ordinary skill in the art will appreciate that while internal systems 430 and external systems 450 are included in FIG. 4, in some embodiments, one or both of these systems may not be required. In an embodiment, the functionality provided by the internal systems 430 and external systems 450 may be provided by the system running the application to view, create, or modify BOs 410.

Each of the systems in FIG. 4 may contain a processing device 412, memory 413, a database 411, and an input/output interface 414, all of which may be interconnected via a system bus. In various embodiments, each of the systems 410, 430, 440, and 450 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 413 may contain different components for retrieving, presenting, changing, and saving data. Memory 413 may include a variety of memory devices, for example, Dynamic Random Access Memory (DRAM), Static RAM (SRAM), flash memory, cache memory, and other memory devices. Additionally, for example, memory 413 and processing device(s) 412 may be distributed across several different computers that collectively comprise a system.

Database 411 may include any type of data storage adapted to searching and retrieval. The database 411 may include SAP database (SAP DB), Informix, Oracle, DB2, Sybase, and other such database systems. The database 411 may include SAP's HANA (high performance analytic appliance) in-memory computing engine and other such in-memory databases.

Processing device 412 may perform computation and control functions of a system and comprises a suitable central processing unit (CPU). Processing device 412 may comprise a single integrated circuit, such as a microprocessing device, or may comprise any suitable number of integrated circuit devices and/or circuit boards working in cooperation to accomplish the functions of a processing device. Processing device 412 may execute computer programs, such as object-oriented computer programs, within memory 413.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method for implementation by one or more data processors forming part of at least one computing device and comprising:
displaying, by at least one data processor in a graphical user interface, at least one scale on at least one axis, wherein the at least one scale presents a range of values associated with at least one business object attribute;
concurrently displaying, by at least one data processor in a graphical user interface, a plurality of visual representations, wherein each visual representation (a) corresponds to a different at least one business object and (b) is displayed relative to the at least one scale based on respective attribute values of the corresponding at least one business object associated with the at least one scale;
displaying, by at least one data processor in the graphical user interface, at least one detail box, wherein each detail box (a) corresponds to a respective visual representation of the at least one business object and (b) presents additional information corresponding to at least one of (i) a business object attribute associated with the at least one scale and (ii) an additional business object attribute of the corresponding at least one business object, wherein each detail box is presented in at least one of an image and text and is different from the visual representations;

toggling, by at least one data processor in the graphical user interface, between displaying and not displaying the at least one detail box; and repositioning, by at least one data processor in the graphical user interface, the at least one visual representation of the at least one business object based on the toggling.

2. The method of claim 1, wherein all detail boxes are displayed.

3. The method of claim 1, wherein the business object is one of a sales order, sales quote, customer quote, service document and proposal.

4. The method of claim 1, wherein information presented by the at least one detail box is interactive.

5. An apparatus comprising:
at least one data processor; and
memory storing instructions, which when executed, cause the at least one data processor to:
display at least one scale on at least one axis, wherein the at least one scale presents a range of values associated with at least one business object attribute;
concurrently display a plurality of visual representations, wherein each visual representation (a) corresponds to at least one business object and (b) is displayed relative to the at least one scale based on respective attribute values of the at least business object associated with the at least one scale;
display at least one detail box, wherein each detail box (a) corresponds to a respective visual representation of the at least one business object and (b) presents additional information corresponding to at least one of (1) a business object attribute associated with the at least one scale and (ii) an additional business object attribute of the corresponding at least one business object, wherein each detail box is presented in at least one of an image and text and is different from the visual representations;
toggle, in a graphical user interface, between displaying and not displaying the at least one detail box; and
reposition, in a graphical user interface, the at least one visual representation of the at least one business object based on the toggling.

6. The apparatus of claim 5, wherein the display is further configured to display all detail boxes.

7. The apparatus of claim 5, wherein the business object is one of a sales order, sales quote, customer quote, service document and proposal.

8. The apparatus of claim 5, wherein information presented by the at least one detail box is interactive.

9. The apparatus of claim 5, wherein the display is further configured to toggle between displaying and not displaying the at least one detail box.

10. The apparatus of claim 9, further comprising:
a processor to reposition the at least one visual representation of the at least one business object based on the toggling.

11. A non-transitory computer-readable medium embodied with computer-executable instructions for causing a computer to execute instructions, the computer instructions comprising:
displaying at least one scale on at least two axes, wherein the at least one scale presents a range of values associated with at least one business object attribute;
concurrently displaying a plurality of visual representations, wherein each visual representation (a) corresponds to at least one business object and (b) is displayed relative to the at least one scale based on respective attribute values of the at least one business object associated with the at least one scale; and
displaying at least one detail box, wherein each detail box corresponds to a respective visual representation of the at least one business object and (b) presents additional information corresponding to at least one of (i) a business object attribute associated with the at least one scale and (ii) an additional business object attribute of the corresponding at least one business object, wherein each detail box is presented in at least one of an image and text and is different from the visual representations;
toggling, in the graphical user interface, between displaying and not displaying the at least one detail box; and
repositioning, in the graphical user interface, the at least one visual representation of the at least one business object based on the toggling.

12. The computer-readable medium of claim 11, wherein all detail boxes are displayed.

13. The computer-readable medium of claim 11, wherein the business object is one of a sales order, sales quote, customer quote, service document.

14. The computer-readable medium of claim 11, wherein information presented by the at least one detail box is interactive.

* * * * *